United States Patent
Mooberry

(10) Patent No.: US 12,397,801 B2
(45) Date of Patent: Aug. 26, 2025

(54) MU ESTIMATION MODELED BY TIE ROD LOADS

(71) Applicant: Robert Bosch GmbH, Stuttgart (DE)

(72) Inventor: Brinton Kirk Mooberry, San Mateo, CA (US)

(73) Assignee: Robert Bosch GmbH, Stuttgart (DE)

( * ) Notice: Subject to any disclaimer, the term of this patent is extended or adjusted under 35 U.S.C. 154(b) by 186 days.

(21) Appl. No.: 18/313,054

(22) Filed: May 5, 2023

(65) Prior Publication Data

US 2024/0367658 A1 Nov. 7, 2024

(51) Int. Cl.
| | | |
|---|---|---|
| *B60W 40/068* | (2012.01) | |
| *B60W 30/02* | (2012.01) | |
| *G05D 1/00* | (2006.01) | |
| *G05D 109/10* | (2024.01) | |

(52) U.S. Cl.
CPC .......... *B60W 40/068* (2013.01); *B60W 30/02* (2013.01); *G05D 1/0291* (2013.01); *B60W 2510/083* (2013.01); *B60W 2520/10* (2013.01); *B60W 2520/20* (2013.01); *B60W 2552/05* (2020.02); *B60W 2552/40* (2020.02); *G05D 2109/10* (2024.01)

(58) Field of Classification Search
CPC .............. B60W 40/068; B60W 30/02; B60W 2552/40; B60W 2552/05; B60W 2510/083; B60W 2520/10; B60W 2520/20; G05D 1/0291; G05D 2109/10
USPC ......................................................... 701/23
See application file for complete search history.

(56) References Cited

U.S. PATENT DOCUMENTS

| | | | |
|---|---|---|---|
| 9,845,109 B2* | 12/2017 | George | ................ B62D 6/006 |
| 11,427,223 B2 | 8/2022 | Poeppel et al. | |
| 2005/0071061 A1 | 3/2005 | Kato et al. | |
| 2011/0130974 A1 | 6/2011 | Yngve et al. | |
| 2012/0024038 A1 | 2/2012 | von Tardy-Tuch et al. | |
| 2018/0106714 A1* | 4/2018 | Skold | ..................... G01N 19/02 |
| 2019/0382010 A1* | 12/2019 | Woodley | ............. B60W 30/146 |

(Continued)

FOREIGN PATENT DOCUMENTS

WO    WO-2020056403 A1 *    3/2020    .............. B60T 8/171

OTHER PUBLICATIONS

Yijun Li, Effect of Load-Dependent Friction on the Estimation of Rack Force in Electric Power-Assisted Steering System, Jul. 19, 2019, ASME Journal of Dynamic Systems, Measurement, and Control vol. 141 (Year: 2019).*

*Primary Examiner* — Matthias S Weisfeld
(74) *Attorney, Agent, or Firm* — Michael Best & Friedrich LLP

(57) ABSTRACT

Examples provide a system and method for controlling a vehicle or a fleet of vehicles. The system includes a set of vehicle sensors configured to measure a speed of the vehicle and a motor torque. The system also includes an electronic processor configured to determine a modeled rack force of the vehicle, determine a normal force factor of the vehicle, determine a vehicle speed factor of the vehicle, determine an adjusted rack force based on a product of the modeled rack force, the normal force factor, and the vehicle speed factor, determine a lateral slip angle of the vehicle, and determine a coefficient of friction estimation based on the adjusted rack force and the lateral slip angle. The electronic processor is further configured to control the vehicle based on the coefficient of friction estimation.

18 Claims, 3 Drawing Sheets

(56) References Cited

U.S. PATENT DOCUMENTS

| | | |
|---|---|---|
| 2020/0023889 A1 | 1/2020 | Rohrmoser |
| 2020/0089243 A1 | 3/2020 | Poeppel et al. |
| 2020/0262439 A1 | 8/2020 | Wyciechowski et al. |
| 2020/0262474 A1* | 8/2020 | Varunjikar ........... B60W 40/068 |
| 2022/0048563 A1* | 2/2022 | Schäfer ................ B62D 5/0481 |
| 2022/0250673 A1* | 8/2022 | Lin ...................... B62D 5/0484 |

* cited by examiner

MU ESTIMATION MODELED BY TIE ROD LOADS

FIELD

Embodiments, examples, and aspects described herein relate to, among other things, a system and method for vehicle control based on coefficient of friction estimation.

SUMMARY

Control strategies for a vehicle may vary based on the friction of the surface that the vehicle or vehicles are driving on. The effectiveness of the control strategy is, in part, dependent on the time a processor in a vehicle takes to estimate a coefficient of friction for the surface. Therefore, there is a need to improve calculation of the coefficient of friction. Aspects disclosed herein provide, among other things, systems and methods for estimating the coefficient of friction for a driving surface of a vehicle or a fleet of vehicles, and controlling the vehicle based on the estimation.

One example provides a system for controlling a vehicle. The system includes a set of vehicle sensors configured to measure a speed of the vehicle and output a measured vehicle speed, and measure a motor torque of a motor in the vehicle and output a measured motor torque. The system also includes an electronic processor configured to determine a modeled rack force of the vehicle, determine a normal force factor of the vehicle, determine a vehicle speed factor of the vehicle, determine an adjusted rack force based on a product of the modeled rack force, the normal force factor, and the vehicle speed factor, determine a lateral slip angle of the vehicle, determine a coefficient of friction estimation based on the adjusted rack force and the lateral slip angle, and control the vehicle based on the coefficient of friction estimation.

In some aspects, the electronic processor is configured to determine the modeled rack force by determining a gear ratio of a motor in the vehicle, determining an inertia of a rotor of the motor, determining an acceleration of the rotor, determining a motor torque of the motor, determining a torsion bar torque of a torsion bar, determining a torsion bar torque to motor torque ratio, and determining a friction torque of the motor.

In some aspects, the electronic processor is further configured to determine the modeled rack force by determining a first product of the inertia of the rotor and the acceleration of the rotor, determining a second product of the torsion bar torque and torsion bar torque to motor torque ratio, determining a first sum of the motor torque, the second product, and the friction torque, determining a first difference between the first product and the first sum, and determining a third product of the gear ratio and the first difference.

In some aspects, the electronic processor is configured to determine the coefficient of friction estimation using a look-up table (LUT).

In some aspects, the electronic processor is further configured to determine a type of driving surface of the vehicle based on the coefficient of friction estimation.

In some aspects, the electronic processor is configured to determine whether the type of driving surface is at least one selected from the group consisting of ice, snow, gravel, wet paved road, and dry paved road.

In some aspects, the system includes a user interface a user interface, wherein the electronic processor is further configured to provide, to the user interface, an indication of the type of driving surface.

In some aspects, the electronic processor is configured to control the vehicle by determining an optimal lateral slip for an upcoming turn, determining a target vehicle speed for achieving the optimal lateral slip, and controlling the vehicle according to the target vehicle speed.

In some aspects, the electronic processor is further configured to transmit the coefficient of friction estimation to an autonomous vehicle fleet controller for controlling speeds of a fleet of autonomous vehicles.

Another example provides a method for controlling a vehicle. The method includes measuring, with a set of vehicle sensors, a speed of the vehicle, outputting a measured vehicle speed a motor torque of a motor in the vehicle, and outputting a measured motor torque. The method also includes determining, with an electronic processor, a modeled rack force of the vehicle, determining a normal force factor of the vehicle, determining a vehicle speed factor of the vehicle, determining an adjusted rack force based on a product of the modeled rack force, the normal force factor, and the vehicle speed factor, determining a lateral slip angle of the vehicle, determining a coefficient of friction estimation based on the adjusted rack force and the lateral slip angle, and controlling the vehicle based on the coefficient of friction estimation.

In some aspects, determining the modeled rack force includes determining a gear ratio of a motor in the vehicle, determining an inertia of a rotor of the motor, determining an acceleration of the rotor, determining a motor torque of the motor, determining a torsion bar torque of a torsion bar, determining a torsion bar torque to motor torque ratio, and determining a friction torque of the motor.

In some aspects, determining the modeled rack force further includes determining a first product of the inertia of the rotor and the acceleration of the rotor, determining a second product of the torsion bar torque and torsion bar torque to motor torque ratio, determining a first sum of the motor torque, the second product, and the friction torque, determining a first difference between the first product and the first sum, and determining a third product of the gear ratio and the first difference.

In some aspects the coefficient of friction estimation includes using a look-up table (LUT).

In some aspects, the method includes determining, with the electronic processor, a type of driving surface of the vehicle based on the coefficient of friction estimation.

In some aspects, determining the type of driving surface of the vehicle based on the coefficient of friction estimation includes determining whether the type of driving surface is at least one selected from the group consisting of ice, snow, gravel, wet paved road, and dry paved road.

In some aspects, the method includes providing, with the electronic processor, an indication to a user interface, the indication indicative of the type of driving surface.

In some aspects, controlling the vehicle includes determining an optimal lateral slip for an upcoming turn, determining a target vehicle speed for achieving the optimal lateral slip, and controlling the vehicle according to the target vehicle speed.

In some aspects, the method includes transmitting, with the electronic processor, the coefficient of friction estimation to an autonomous vehicle fleet controller for controlling speeds of a fleet of autonomous vehicles.

DETAILED DESCRIPTION

Figure 1:
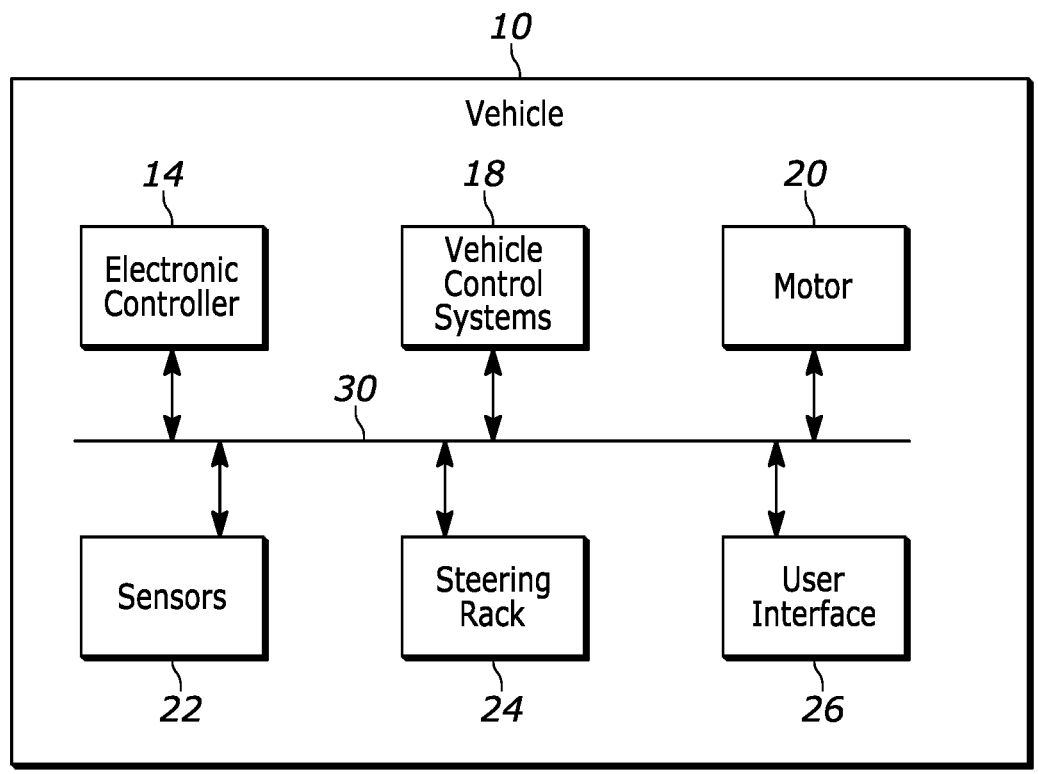
FIG. 1 illustrates a vehicle, according to some aspects.

Before any aspects, features, or instances are explained in detail, it is to be understood that the aspects, features, or instances are not limited in their application to the details of construction and the arrangement of components set forth in the following description or illustrated in the following drawings. Other instances are possible and are capable of being practiced or of being carried out in various ways.

Also, it is to be understood that the phraseology and terminology used herein is for the purpose of description and should not be regarded as limiting. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software based devices, as well as a plurality of different structural components may be utilized to implement the invention. For example, "control units" and "controllers" described in the specification can include one or more electronic processors, one or more memory modules including a non-transitory computer-readable medium, one or more input/output interfaces, and various connections (for example, a system bus) connecting the components. It should be understood that although certain drawings illustrate hardware and software located within particular devices, these depictions are for illustrative purposes only. In some instances, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

Lateral slip angle, otherwise referred to herein as "side slip" or "slip angle," is the angle between the direction in which a vehicle's wheel is pointing and the direction in which the steered axle is actually traveling. The lateral slip angle results in a lateral force perpendicular to the longitudinal wheel axis of the vehicle. The lateral force increases approximately linearly for the first few degrees of slip angle, then increases non-linearly to a maximum before beginning to decrease. The lateral force, determined based on lateral acceleration, and the slip angle are historically used to estimate the coefficient of friction of the surface on which a vehicle is driving. The coefficient of friction may alternatively be referred to herein as "surface mu." A vehicle controller may use surface mu as an input to a vehicle control strategy such as, for example, anti-lock braking systems (ABS), traction control systems (TCS), vehicle speed control, and other vehicle control systems. A vehicle controller may also use surface mu as an input to an autonomous vehicle fleet control strategy, for example, to slow down traffic on surfaces having low mu due to ice, snow, oil, or hydroplaning. For example, surface mu data may be transmitted from a vehicle to a mu map accessible to other connected vehicles.

FIG. 1 schematically illustrates a vehicle 10, according to some aspects. In some instances, the vehicle 10 is an autonomous vehicle. The term "autonomous vehicle" is used in an inclusive way to refer to an autonomous or partially autonomous vehicle, which possesses varying degrees of automation (that is, the vehicle is configured to drive itself with limited, or in some cases no, input from a driver). The term "driver," as used herein, generally refers to an occupant of a vehicle, who operates the controls of the vehicle or provides control input to the vehicle to influence the operation of the vehicle. However, in some instances, the vehicle 10 is not an autonomous vehicle. In some instances, vehicle 10 represents one of many vehicles in a fleet.

In the illustrated example, the vehicle 10 includes an electronic controller 14, vehicle control systems 18, a motor 20, a plurality of sensors 22 installed on the vehicle 10, a steering rack 24 for steering a front and/or rear axle of the vehicle 10, and a user interface 26. The components of the vehicle 10, along with other various modules and components are electrically and communicatively coupled to each other via direct connections or by or through one or more control or data buses (for example, the bus 30), which enable communication therebetween. The use of control and data buses for the interconnection between, and communication among, the various modules and components would be known to a person skilled in the art in view of the invention described herein. In some instances, the bus 30 is a controller area network (CAN) bus. In some instances, the bus 30 is an automotive Ethernet, a FlexRay™ communications bus, or another suitable bus. In some instances, some or all of the components of the vehicle 10 may be communicatively coupled using suitable wireless modalities (for example, Bluetooth™ or near field communication connections).

The electronic controller 14 (described in greater detail below with respect to FIG. 2) communicates with vehicle control systems 18 and the sensors 22. The electronic controller 14 may receive sensor data from the sensors 22 and determine control commands for the vehicle 10. The electronic controller 14 transmits the control commands to, among other things, the vehicle control systems 18 to operate or assist in operating the vehicle 10 (for example, by generating braking signals, acceleration signals, steering signals). In some instances, the electronic controller 14 is part of one or more vehicle controllers that implement autonomous or partially autonomous control of the vehicle 10. The electronic controller 14 may located in a suitable location or locations in the vehicle 10. For example, the electronic controller 14 may be located between the bus 30 and the steering rack 24.

The vehicle control systems 18 may include controllers, actuators, and the like for controlling aspects of the operation of the vehicle 10 (for example, acceleration, braking, shifting gears, and the like). The vehicle control systems 18 communicate with the electronic controller 14 via the bus 30.

The sensors 22 measure one or more attributes of the vehicle 10 and the environment around the vehicle 10 and communicate information regarding those attributes to the other components of the vehicle 10 using, for example, messages transmitted on the bus 30. The sensors 22 may include, for example, sensors that detect accelerator pedal position and brake pedal position, wheel speed sensors, steering angle sensors, vehicle speed sensors, yaw, pitch, and roll sensors, Hall effect sensors, force sensors, torque sensors, rotor position sensors, and vehicle proximity sensors (for example, ultrasonic). In some instances, the sensors 22 are similar to sensor sets used in an electronic stability control (ESC) system and similar vehicle control systems.

In some instances, the electronic controller 14 controls aspects of the vehicle 10 based on commands received from the user interface 26. The user interface 26 provides an interface between the components of the vehicle 10 and an occupant (for example, a driver) of the vehicle 10. The user interface 26 is configured to receive input from the driver, receive indications of vehicle status from the system's controllers (for example, the electronic controller 14), and provide information to the driver based on the received indications. The user interface 26 provides visual output, such as, for example, graphical indicators (for example, fixed or animated icons), lights, colors, text, images, combinations of the foregoing, and the like. The user interface 26 includes a suitable display mechanism for displaying the visual output, such as, for example, a liquid crystal display (LCD) touch screen, or an organic light-emitting diode (OLED) touch screen, or other suitable mechanisms. In some instances, the user interface 26 displays a graphical user interface (GUI) (for example, generated by the electronic controller 14 and presented on a display screen) that enables a driver or passenger to interact with the vehicle 10. The user interface 26 may also provide audio output to the driver via a chime, buzzer, speaker, or other suitable device included in the user interface 26 or separate from the user interface 26. In some instances, user interface 26 provides haptic outputs to the driver by vibrating one or more vehicle components (for example, the vehicle's steering wheel and the seats), for example, using a vibration motor. In some instances, user interface 26 provides a combination of visual, audio, and haptic outputs.

Figure 2:
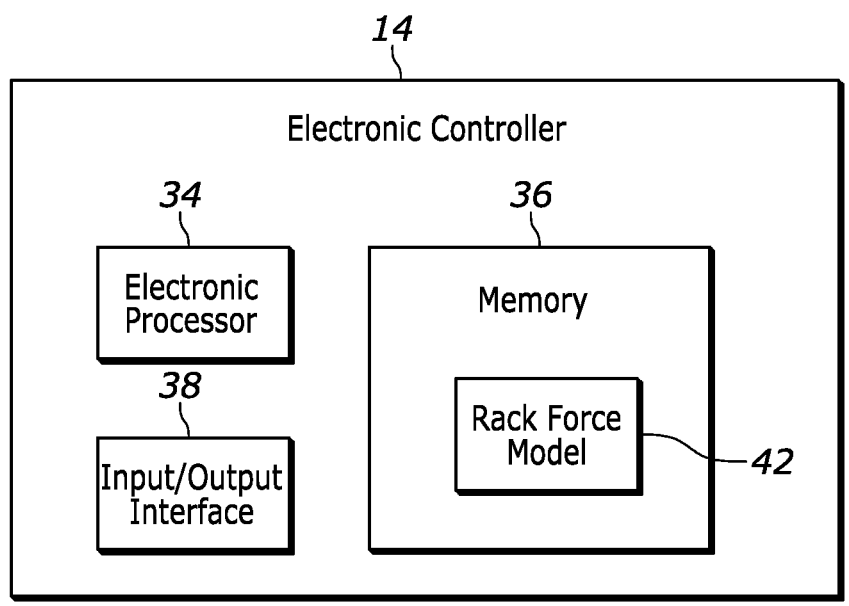
FIG. 2 illustrates an electronic controller for a vehicle, according to some aspects.

FIG. 2 illustrates an example of the electronic controller 14, which includes an electronic processor 34 (for example, a microprocessor, application specific integrated circuit, etc.), a memory 36, and an input/output interface 38. The memory 36 may be made up of one or more non-transitory computer-readable media and includes at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The electronic processor 34 is coupled to the memory 36 and the input/output interface 38. The electronic processor 34 sends and receives information (for example, from the memory 36 and/or the input/output interface 38) and processes the information by executing one or more software instructions or modules, capable of being stored in the memory 36, or another non-transitory computer readable medium. The software can include firmware, one or more applications, program data, filters, rules, one or more program modules, and other executable instructions. The electronic processor 34 is configured to retrieve from the memory 36 and execute, among other things, software for performing methods as described herein. In the example illustrated, the memory 36 stores, among other things a rack force model 42 including a rack force model look-up table (LUT) for storing a model of vehicle rack force values, lateral slip angle values, and vehicle speeds used in estimating surface mu. The input/output interface 38 transmits and receives information from devices external to the electronic controller 14 (for example, components of the vehicle 10 via the bus 30). It should be understood that the electronic controller 14 may include additional components than those illustrated in FIG. 2 and in various configurations. For example, in some examples, the electronic controller 14 includes multiple electronic processors 34, multiple memory modules 36, multiple input/output interfaces 38, or a combination thereof.

Figure 3:
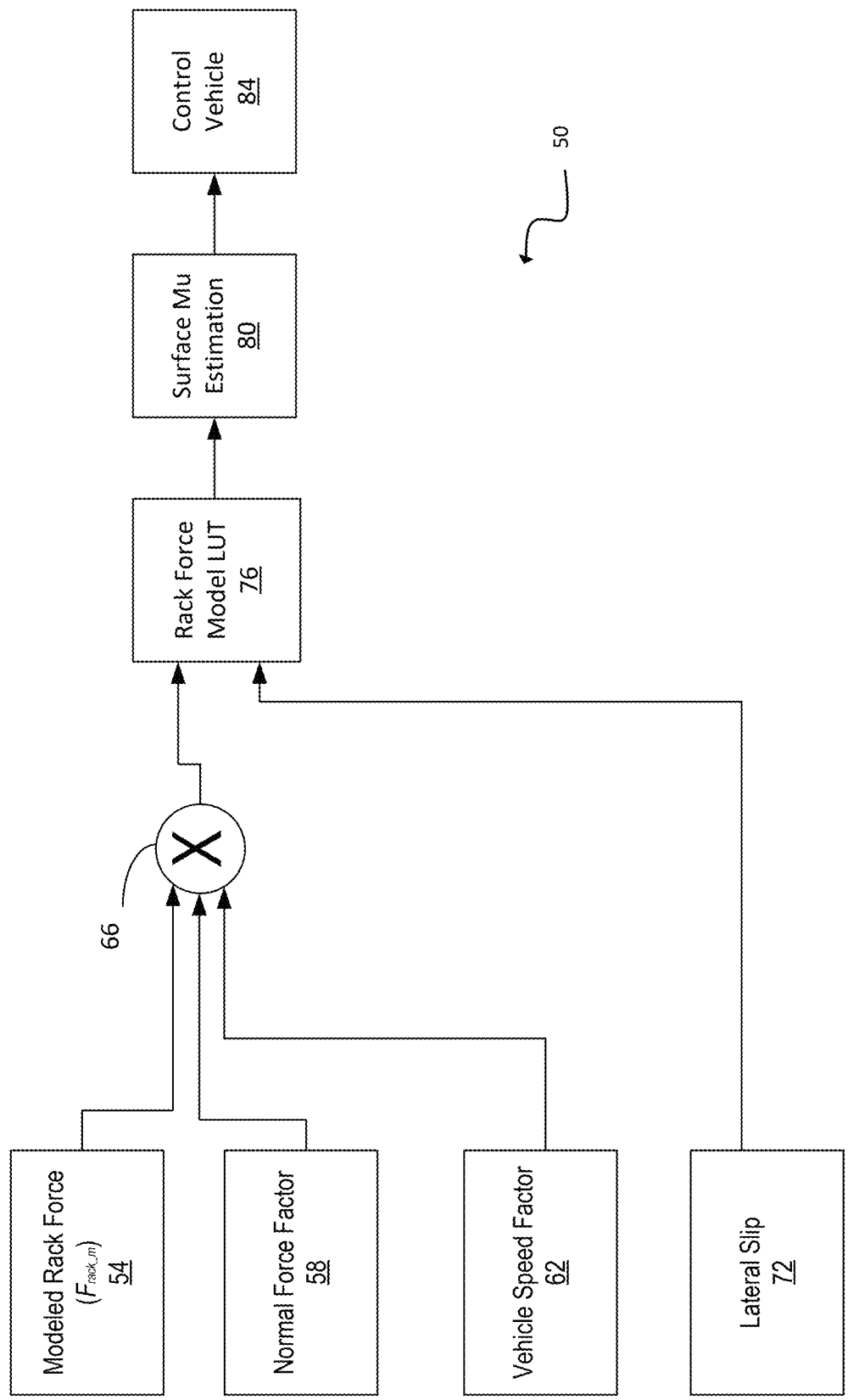
FIG. 3 illustrates a method for estimating a coefficient of friction, according to some aspects.

FIG. 3 illustrates an example method 50 executable by the electronic processor 34 for estimating surface mu, according to some aspects. Rather than estimating surface mu based on lateral acceleration, which may require a sufficiently large acceleration value (e.g., 3 meters per second squared (m/s$^2$)) in order to accurately estimate surface, the electronic processor 34 estimates surface mu based, in part, on the rack force of the steering rack 24 (e.g., based tie rod loads). Therefore, the electronic processor 34 may estimate surface mu faster and at lower lateral acceleration values (e.g., at 1 m/s$^2$), and, as a result, generate a control signal for the vehicle 10 sooner.

At block 54, the electronic processor 34 determines a modeled rack force $F_{rack\_m}$ by determining a gear ratio of the motor 20, an inertia of a rotor included in the motor 20, an acceleration of the rotor, a motor torque of the motor 20, a torsion bar torque of a torsion bar in the vehicle 10, a ratio of the torsion bar torque to motor torque ratio and/or a friction torque of the motor 20. In one example, the electronic processor 34 calculates or determines a first product of the inertia of the rotor and the acceleration of the rotor. The electronic processor 34 determines a second product of the torsion bar torque and the ratio of the torsion bar torque to motor torque. The electronic processor 34 then determines a first sum of the motor torque, the second product, and the friction torque. The electronic processor 34 determines a first difference between the first product and the first sum. The electronic processor 34 determines a third product of the gear ratio and the first difference.

In one example, the electronic processor 34 determines the modeled rack force $F_{rack\_m}$ according to Equation 1, below:

$$F_{rack\_m} = i_{servo} \times [J \times \ddot{\varphi} - (M_{mot} + M_{TB} \times i + M_{fric})] \qquad \text{Equation 1}$$

Where $i_{servo}$ is the gear ratio of the motor 20, J is the inertia of the rotor, $\ddot{\varphi}$ is the acceleration of the rotor, $M_{mot}$ is the motor torque, $M_{TB}$ is the torsion bar torque, i is the ratio of the of the torsion bar torque to motor torque, and $M_{fric}$ is the friction that resists the lateral movement of the steering gear of the vehicle 10.

At block 58, the electronic processor 34 determines a normal force factor for the vehicle 10 (e.g., a normal force on the steered axle of the vehicle) due to the bank angle of the vehicle 10. For example, the electronic processor 34 determines the normal force factor based on a front axle normal force of the vehicle 10. For example, the electronic processor 34 determines a front axle normal force based on a summation of the normal force on the front left wheel of the vehicle 10 and the normal force on the front right wheel of the vehicle 10. The electronic processor 34 determines the normal force on the front left wheel of the vehicle 10 based, in part, on a vertical force distribution for the front left wheel in a lateral direction. The electronic processor 34 determines the vertical force distribution derived from the longitudinal and lateral acceleration of the vehicle 10. For example, the vertical force distribution is adjusted based on slope, bank angle, center of gravity, height, trackwidth, wheelbase, and/or mass of the vehicle 10.

In some instances, the electronic processor 34 determines the normal force on the rear axle of the vehicle 10 (e.g., when the vehicle 10 is a rear-steer vehicle). For example, the electronic processor 34 determines a rear axle normal force based on a summation of the normal force on the rear left wheel of the vehicle 10 and the normal force on the rear right wheel of the vehicle 10. With respect to the rear axle, the electronic processor 34 determines the vertical force distribution derived from the longitudinal and lateral acceleration of the vehicle 10, which is adjusted for slope, bank angle, center of gravity, height, trackwidth, wheelbase, and mass of the vehicle 10.

The electronic processor 34 then determines the normal force factor according to, for example, the values in Table 1.

TABLE 1

| | Normal Force Factor | | | | | | | | |
|---|---|---|---|---|---|---|---|---|---|
| | 0.9 | 0.95 | 1 | 1.05 | 1.1 | 1.15 | 1.2 | 1.25 | 1.3 |
| Steered Axle Normal Force (Lbs) | 2500 | 2750 | 3000 | 3250 | 3500 | 3750 | 4000 | 4250 | 4500 |

At block 62, the electronic processor 34 determines a vehicle speed factor for the vehicle 10. The electronic processor 34 determines the vehicle speed factor based on the vehicle speed measured by the sensors 22. The electronic processor 34 determines the vehicle speed factor according to, for example, the values in Table 2.

TABLE 2

| Vehicle Speed Factor | 3 | 2 | 1 | 0.8 | 0.7 | 0.6 | 0.6 | 0.6 | 0.6 |
|---|---|---|---|---|---|---|---|---|---|
| Vehicle Speed (kph) | 0 | 2 | 5 | 10 | 40 | 80 | 120 | 160 | 200 |

At block 66, after determining the modeled rack force $F_{rack\_m}$, the normal force factor, and the vehicle speed factor, the electronic processor 34 determines an adjusted rack force as a product of the modelled rack force $F_{rack\_m}$, the normal force factor, and the vehicle speed factor. The adjusted rack force accounts for the dynamic normal force on the axle and the speed of the vehicle.

At block 72, the electronic processor 34 determines the lateral slip for the vehicle 10. The electronic processor 34 may determine lateral slip according to known methods, for example, based on the speed of the vehicle 10, the steering angle of the vehicle 10, the distance between the front axle and the center of mass of the vehicle 10, and the measured yaw rate of the vehicle 10.

At block 76, the electronic processor 34 inputs the adjusted rack force and the lateral slip into the rack force model LUT. The rack force model 42 stores, for each of a plurality of various vehicle speeds, rack force values required to turn the steered axle tires and build lateral slip (e.g., the lateral slip as requested by the driver turning the steering wheel, and/or as requested by a vehicle controller). The rack force model 42 is periodically updated by the electronic processor 34 as the vehicle 10 travels, for example, every millisecond, every five milliseconds, every ten milliseconds, etc.

Figure 4:
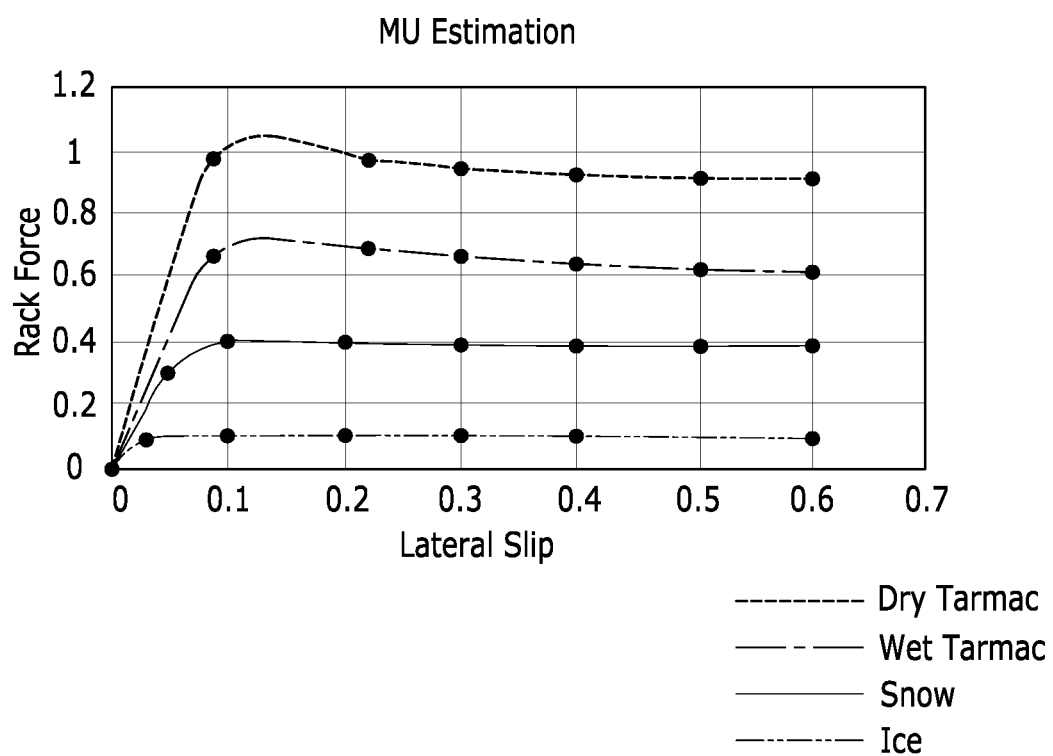
FIG. 4 illustrates a comparison of lateral slip to rack force, according to some aspects.

As an example, FIG. 4 illustrates a mu estimation graph comparing lateral slip at the x-axis to adjusted rack force at the y-axis for four different surface types. As illustrated in FIG. 4, ice generally requires less rack force to build a lateral slip angle compared to dry tarmac, wet tarmac, and snow. Snow generally requires less rack force to build a lateral slip angle compared to wet tarmac and dry tarmac. Wet tarmac generally requires less rack force to build a lateral slip angle compared to dry tarmac. While four types of surface estimations are described with respect to FIG. 4, it should be understood that the rack force model 42 may store surface mu data for more than four surface types or less than four surface types.

Referring again to FIG. 3, at block 80, the electronic processor 34 computes, based on the rack force model LUT, a surface mu estimation. In some instances, the electronic processor 34 estimates, based on the output of the rack force model LUT, a type of driving surface of the vehicle 10. For example, the electronic processor 34 may estimate that the vehicle 10 is driving on at least one selected from the group consisting of dry paved road (e.g., dry tarmac, dry asphalt, dry concrete, etc.), wet paved road (e.g., wet tarmac, wet asphalt, wet concrete, etc.), a dirt road, a gravel road, snow, and ice.

At block 84, based on the surface mu estimation output by the rack force model LUT, the electronic processor 34 controls the vehicle 10. For example, based on the output surface mu estimation, the electronic processor 34 identifies low-mu surfaces on the road, and lowers the speed of the vehicle 10. For example, the electronic processor 34 may determine a target vehicle speed based on the surface mu estimation, and control the vehicle motor 20 based on the target vehicle speed. In some instances, the electronic processor 34 provides a recommendation to the user via the user interface 26 regarding the target vehicle speed.

In some instances, the electronic processor 34 controls the vehicle 10 to initiate turns sooner on low-mu surfaces. For example, the electronic processor 34 may determine an optimal lateral slip for an upcoming turn. Based on the optimal lateral slip, the electronic processor 34 may determine one or both of a target vehicle speed to achieve the upcoming turn and a target position to initiate the turn.

In some instances, the electronic processor 34 controls the vehicle 10 to change lanes such that the vehicle 10 drives on a higher-mu surface.

In some instances, the electronic processor 34 provides an indication to the user interface 26 based on the surface mu estimation. For example, the electronic processor 34 may provide an indication of the type of driving surface of the vehicle 10, an indication of road slipperiness, and/or a recommendation for a driving maneuver (e.g., changing lanes, reducing speed, etc.).

The electronic processor 34 repeatedly performs the steps of the method 50. For example, the electronic processor 34 may iterate through the steps of the method 50 every millisecond, every five milliseconds, every ten milliseconds, or another iteration period.

Thus, aspects herein provide, among other things, systems and methods for mu estimation for a vehicle modeled by tie rod loads.

What is claimed is:

1. A system for controlling a vehicle, the system comprising:
    a set of vehicle sensors, the set of vehicle sensors configured to:
        measure a speed of the vehicle and output a measured vehicle speed,
        measure a motor torque of a motor in the vehicle and output a measured motor torque,
    electronic processor configured to:
        determine a modeled rack force of the vehicle,
        determine a normal force factor of the vehicle,
        determine a vehicle speed factor of the vehicle,
        determine an adjusted rack force based on a product of the modeled rack force, the normal force factor, and the vehicle speed factor,
        determine a lateral slip angle of the vehicle,
        determine a coefficient of friction estimation based on the adjusted rack force and the lateral slip angle, and
        control the vehicle based on the coefficient of friction estimation.

2. The system of claim 1, wherein the electronic processor is configured to determine the modeled rack force by
    determining a gear ratio of a motor in the vehicle,
    determining an inertia of a rotor of the motor,
    determining an acceleration of the rotor,
    determining a motor torque of the motor,
    determining a torsion bar torque of a torsion bar,
    determining a torsion bar torque to motor torque ratio, and
    determining a friction torque of the motor.

3. The system of claim 2, wherein the electronic processor is further configured to determine the modeled rack force by
    determining a first product of the inertia of the rotor and the acceleration of the rotor,
    determining a second product of the torsion bar torque and torsion bar torque to motor torque ratio,
    determining a first sum of the motor torque, the second product, and the friction torque,
    determining a first difference between the first product and the first sum, and
    determining a third product of the gear ratio and the first difference.

4. The system of claim 1, wherein the electronic processor is configured to determine the coefficient of friction estimation using a look-up table (LUT).

5. The system of claim 1, wherein the electronic processor is further configured to determine a type of driving surface of the vehicle based on the coefficient of friction estimation.

6. The system of claim 5, wherein the electronic processor is configured to determine whether the type of driving surface is at least one selected from the group consisting of ice, snow, gravel, wet paved road, and dry paved road.

7. The system of claim 6, further comprising
    a user interface, wherein
    the electronic processor is further configured to provide, to the user interface, an indication of the type of driving surface.

8. The system of claim 1, wherein the electronic processor is configured to control the vehicle by
    determining an optimal lateral slip for an upcoming turn,
    determining a target vehicle speed for achieving the optimal lateral slip, and
    controlling the vehicle according to the target vehicle speed.

9. The system of claim 1, wherein the electronic processor is further configured to transmit the coefficient of friction estimation to an autonomous vehicle fleet controller for controlling speeds of a fleet of autonomous vehicles.

10. A method for controlling a vehicle, the method comprising:
    measuring, with a set of vehicle sensors, a speed of the vehicle;
    outputting, with the set of vehicle sensors, a measured vehicle speed;
    measuring, with the set of vehicle sensors, a motor torque of a motor in the vehicle;
    outputting, with the set of vehicle sensors, a measured motor torque;
    determining, with an electronic processor, a modeled rack force of the vehicle;
    determining, with the electronic processor, a normal force factor of the vehicle;
    determining, with the electronic processor, a vehicle speed factor of the vehicle;
    determining, with the electronic processor, an adjusted rack force based on a product of the modeled rack force, the normal force factor, and the vehicle speed factor;
    determining, with the electronic processor, a lateral slip angle of the vehicle;
    determining, with the electronic processor, a coefficient of friction estimation based on the adjusted rack force and the lateral slip angle; and
    controlling, with the electronic processor, the vehicle based on the coefficient of friction estimation.

11. The method of claim 10, wherein determining, with the electronic processor, the modeled rack force includes
    determining a gear ratio of a motor in the vehicle,
    determining an inertia of a rotor of the motor,
    determining an acceleration of the rotor,
    determining a motor torque of the motor,
    determining a torsion bar torque of a torsion bar,
    determining a torsion bar torque to motor torque ratio, and
    determining a friction torque of the motor.

12. The method of claim 11, wherein determining, with the electronic processor, the modeled rack force further includes
    determining a first product of the inertia of the rotor and the acceleration of the rotor,
    determining a second product of the torsion bar torque and torsion bar torque to motor torque ratio,
    determining a first sum of the motor torque, the second product, and the friction torque,
    determining a first difference between the first product and the first sum, and
    determining a third product of the gear ratio and the first difference.

13. The method of claim 10, wherein determining, with the electronic processor, the coefficient of friction estimation includes using a look-up table (LUT).

14. The method of claim 10, further comprising
determining, with the electronic processor, a type of driving surface of the vehicle based on the coefficient of friction estimation.

15. The method of claim 14, determining, with the electronic processor, the type of driving surface of the vehicle based on the coefficient of friction estimation includes determining whether the type of driving surface is at least one selected from the group consisting of ice, snow, gravel, wet paved road, and dry paved road.

16. The method of claim 15, further comprising providing, with the electronic processor, an indication to a user interface, the indication indicative of the type of driving surface.

17. The method of claim 10, wherein controlling the vehicle includes
determining an optimal lateral slip for an upcoming turn,
determining a target vehicle speed for achieving the optimal lateral slip, and
controlling the vehicle according to the target vehicle speed.

18. The method of claim 10, further comprising transmitting, with the electronic processor, the coefficient of friction estimation to an autonomous vehicle fleet controller for controlling speeds of a fleet of autonomous vehicles.

\* \* \* \* \*